United States Patent
Henry et al.

[11] Patent Number: 5,864,690
[45] Date of Patent: Jan. 26, 1999

[54] APPARATUS AND METHOD FOR REGISTER SPECIFIC FILL-IN OF REGISTER GENERIC MICRO INSTRUCTIONS WITHIN AN INSTRUCTION QUEUE

[75] Inventors: G. Glenn Henry; Terry Parks, both of Austin, Tex.

[73] Assignee: Integrated Device Technology, Inc., Santa Clara, Calif.

[21] Appl. No.: 902,658

[22] Filed: Jul. 30, 1997

[51] Int. Cl.$^6$ .................................................... G06F 9/30
[52] U.S. Cl. ........................... 395/384; 395/561; 395/595
[58] Field of Search ................................... 395/381, 384, 395/385, 387, 390, 392, 395, 561, 568, 595, 598, 800.23, 800.41

[56] References Cited

U.S. PATENT DOCUMENTS

| | | | |
|---|---|---|---|
| 4,587,612 | 5/1986 | Fisk et al. ................................. | 395/500 |
| 4,841,476 | 6/1989 | Mitchell et al. ......................... | 395/500 |
| 5,247,624 | 9/1993 | Koumoto et al. ........................ | 395/387 |
| 5,471,591 | 11/1995 | Edmundson et al. ................... | 395/393 |
| 5,673,427 | 9/1997 | Brown et al. ............................ | 395/595 |

*Primary Examiner*—Krisna Lim
*Assistant Examiner*—Viet Vu
*Attorney, Agent, or Firm*—James W. Huffman

[57] ABSTRACT

An apparatus and method for improving the execution speed of programs including register generic micro instructions within a pipeline processor is provided. The processor contains a translator and a control ROM, both of which may produce micro instructions associated with the program. When a micro instruction is produced by the control ROM, and when the micro instruction contains register generic operands, the micro instruction is placed within a ROM instruction queue. While in the instruction queue, register specific operands may be placed within the micro instruction. Thus, by the time the micro instruction reaches an instruction register, the micro instruction is ready for execution by later stages in the pipeline, without requiring a hole or delay in the pipeline to fill in register specific operands.

35 Claims, 5 Drawing Sheets

|  | Clock Number | | | | | | | | | |
|---|---|---|---|---|---|---|---|---|---|---|
| Instruction number | 1 | 2 | 3 | 4 | 5 | 6 | 7 | 8 | 9 | 10 |
| Instruction i | I | X | R | A | D | W | | | | |
| Instruction i + 1 | | I | X | R | A | D | W | | | |
| Instruction i + 2 | | | I | X | R | A | D | W | | |
| Instruction i + 3 | | | | I | X | R | A | D | W | |
| Instruction i + 4 | | | | | I | X | R | A | D | W |

APPARATUS AND METHOD FOR REGISTER SPECIFIC FILL-IN OF REGISTER GENERIC MICRO INSTRUCTIONS WITHIN AN INSTRUCTION QUEUE

BACKGROUND

1. Field of the Invention

This invention relates in general to the field of instruction execution in a pipeline processing system, and more particularly to a method and apparatus which fast fills micro instructions having register generic operands with specific register values while the micro instructions are within an instruction queue.

2. Description of the Related Art

Modern computer systems utilize a number of different processor architectures to perform program execution. In conventional microprocessor based systems, a computer program is made up of a number of macro instructions that are provided to the microprocessor for execution. The microprocessor decodes each macro instruction into a sequence of micro instructions, i.e., simple machine instructions that the hardware in the microprocessor can understand, and executes all of the micro instructions in the sequence before decoding another macro instruction.

A macro instruction is typically of the form: OPCODE OPERAND1, OPERAND2, where OPCODE specifies the type of operation to be performed, such as add, multiply or nor, and OPERAND1, OPERAND2 specifies the data upon which the operation is to be performed. It should be appreciated that operands 1 and 2 specify data located either in a register within the microprocessor, such as R1, R2, R3, etc., or a location in memory that contains data.

A more specific example of a macro instruction that performs addition on two values, one located in memory [M], and the other located in a register R within the processor, and stores the result in memory, is:

ADD [M],R

This macro instruction is fetched by a microprocessor and provided to a control unit within the microprocessor that translates or decodes the macro instruction into a sequence of micro instructions, or instruction primitives, that the execution unit within the microprocessor understands. The micro instruction sequence generated by the control unit is:

LOAD TEMP, [M]
ADD TEMP,R
STORE [M], TEMP

Since the execution unit of the microprocessor cannot operate directly on data within memory, the microprocessor first loads the data from memory [M] into a temporary register. The microprocessor then adds the contents of the temporary register to the contents in register R. And finally, the microprocessor stores the result of the add back into memory [M].

The control unit within the microprocessor typically includes a control ROM which contains micro instruction sequences, and translate/decode logic which decodes the macro instructions, and addresses the control ROM to provide the appropriate micro instruction sequence for each macro instruction. For the example above, the micro instruction sequence would be stored in the control ROM at a designated address. When the control unit of the microprocessor received a macro instruction of the form indicated above, it would address the control ROM which would, in turn, provide the micro instruction sequence to an execution unit.

As microprocessors became more powerful, their macro instruction sets increased in both size and complexity. Thus the size of the control ROM which contained the micro instruction sequences associated with the macro instructions grew accordingly. However, the growth in size of the control ROM has been exponential rather than linear. As discussed above, for each macro instruction, a sequence of micro instructions is provided in the control ROM. But a single sequence of micro instructions is not capable of handling all variations of a macro instruction. For example, the opcode for the instruction above is ADD. This opcode instructs the execution unit to add two values together, but by itself, does not determine which two values. It is the operands 1 and 2 that specify the values upon which the add function will operate. In a simple instance, a microprocessor may have as many as eight different data registers (R1–R8) upon which the ADD operation might operate, with complex microprocessors having even more. To accommodate all operand permutations for the ADD instruction, at least 56 [n!/(n−k)!] different micro instruction sequences would need to be provided for in the control ROM. And, this does not include any operands which specify memory locations for the data. Thus, if the control ROM were to provide operand specific micro instruction sequences for each macro instruction, and for all combination of operands, the size of the control ROM would be enormous.

To overcome this problem, register generic micro instruction sequences are often provided by the control ROM. For the above ADD [M],R macro instruction, the control ROM would provide the following micro instruction sequence:

LOAD TEMP,X
ADD TEMP,Y
STORE X,TEMP where X and Y do not specify any particular operand. The control ROM provides these micro instructions, one at a time, to the translate/decode logic. The translate/decode logic takes these register generic micro instructions, and fills in the appropriate operands specified by the macro instruction. By allowing the translate/decode logic to fill in register generic operands, the size and complexity of the control ROM is dramatically reduced. However, with the advantage of decreased size and complexity of the control ROM comes the disadvantage of decreased performance. Now, the control unit not only has to look up the appropriate micro instruction sequence for each macro instruction, but in addition, has to fill in appropriate operands for each micro instruction. This fill in process requires additional processor time, which means that execution of the micro instruction sequence is delayed.

In more advanced computer systems, another type of microprocessor, called a "pipeline" processor, is used. A pipeline processor decodes macro instructions, similar to those of the conventional microprocessor discussed above, into a sequence of micro instructions. However, the micro instructions are overlapped during execution to improve performance. Such overlapping of micro instructions during execution is known as "pipelining". Pipelining is a key implementation technique used to make fast microprocessors.

A pipeline is like an assembly line. Each step in a pipeline operates in parallel with other steps, though on a different micro instruction. Like the assembly line, different steps are completing different parts of a macro instruction in parallel. Each of these steps is called a pipe stage or a pipe segment. The stages are connected one to the next to form a pipe-instructions enter at one end, progress through the stages, and exit at the other end.

Flow of instructions through a pipeline is typically controlled by a system clock, or processor clock signal. For example, during a first clock cycle, a first macro instruction may be fetched from memory. By the end of the clock cycle, the first macro instruction is placed into a buffer which feeds a translate/decode stage. During a second clock cycle, a second macro instruction may be fetched and placed into the buffer. In addition, and in parallel to the second macro instruction fetch, the first macro instruction is "read" by the translate/decode logic, and translated into a sequence of micro instructions. By the end of the second clock cycle, a first micro instruction in the sequence is provided to the instruction register. During a third clock cycle, the first micro instruction is provided to later stages in the pipeline, and a second micro instruction is stored in the instruction register. This pipeline process continues indefinitely as long as macro instructions can be fetched into the buffer during each clock cycle, and as long as the translate/decode logic can provide micro instructions to later stages in the pipeline during each clock cycle.

If we apply the idea of providing register generic micro instructions to a pipeline processor, the result is as follows. During a first clock cycle, a first macro instruction may be fetched from memory. By the end of the clock cycle, the first macro instruction is placed into a buffer which feeds a translate/decode stage. During a second clock cycle, a second macro instruction may be fetched and placed into the buffer. In addition, and in parallel to the second macro instruction fetch, the first macro instruction is "read" by the translate/decode logic, and the control ROM is addressed to provide the appropriate micro instruction sequence. By the end of the second clock cycle, a first micro instruction in the sequence is provided to the instruction register by the control ROM. In this case, however, the micro instruction that is provided, is register generic, i.e., it does not specify any particular operands. During a third clock cycle, the translate/decode logic must fill in the specific operands designated by the macro instruction. During a fourth cycle, the first micro instruction is provided to later stages in the pipeline, and a second micro instruction is stored in the instruction register. However, this micro instruction also needs to be filled in with register specific operands.

Thus, each time a register generic micro instruction is provided by the control ROM to the instruction register, translate/decode logic is required to fill in register specific operands. In pipeline processors, such register specific fill in of control ROM generated micro instructions requires at least one clock cycle per micro instruction. Such additional processing requirement adds delays or holes in the pipeline. And, every delay or hole in the pipeline increases the time required to execute the micro instruction sequence. Processor performance is effected accordingly. For a background on techniques used to fill in register generic operands, please see U.S. patent application Ser. No. 5,717,910 entitled "METHOD AND APPARATUS FOR REGISTER ADDRESS FILL-IN OF REGISTER GENERIC MICROCODE INSTRUCTIONS" by Glenn Henry, and Terry Parks, which is incorporated herein by reference.

One technique that has been used to overcome delays or holes in the pipeline, i.e., holes resulting from the fetch and translate stages of the pipeline, is to introduce an instruction queue between the translate/decode logic and the instruction register. The instruction queue can act as buffer to hold micro instructions generated by the translate/decode logic, before they are needed by the instruction register. If the instruction queue is able to "get ahead" of the pipeline, then later stalls or delays in the pipeline may be overcome by providing the micro instructions from the instruction queue. For a general background on instruction queues, please see U.S. patent application Ser. No. 5,619,667 entitled "METHOD AND APPARATUS FOR FAST FILL OF TRANSLATOR INSTRUCTION QUEUE", by Glenn Henry and Terry Parks, which is incorporated herein by reference. However, heretofore instruction queues have not been used to store micro instructions having register generic operands, nor has there been provided any mechanism which allows register generic micro instructions to be filled in while in an instruction queue.

SUMMARY

For the foregoing reasons, there is a need for an apparatus and method which fast fills register specific operands into register generic micro instructions, while the register generic micro instructions are within an instruction queue.

To address the above-detailed deficiencies, it is an object of the present invention to overcome delays associated with filling in register specific operands in register generic micro instructions.

It is therefore a feature of the present invention to provide a processor system, for executing macro instructions, where the processor system includes: an instruction cache, for storing the macro instructions; and a control unit, connected to the instruction cache, for retrieving the macro instructions from the instruction cache, and for translating each of the macro instructions into a plurality of micro instructions, the plurality of micro instructions having register specific operands. The control unit includes: a control ROM, for storing a plurality of micro instruction sequences having register generic operands; and a translator, connected to the control ROM, for selecting ones of the plurality of micro instruction sequences having register generic operands, and for providing register specific operands to the selected ones of the plurality of micro instruction sequences having register generic operands. The processor system also includes: an instruction register, connected to the translator, for storing the plurality of micro instructions having register specific operands, for execution in later stages of the processor system; an instruction queue, connected to the control ROM and to the instruction register, for receiving from the control ROM, and for temporarily storing, the plurality of micro instructions having register generic operands, and for providing the plurality of micro instructions having register specific operands to the instruction register; and operand fill in logic, connected to the translator, and to the instruction queue, for receiving the register specific operands from the translator, and for converting the plurality of micro instructions having register generic operands into the plurality of micro instructions having register specific operands.

An additional feature of the present invention is to provide the processor system as mentioned above where the processor system is a pipeline microprocessor.

A further feature of the present invention is to provide the processor system as mentioned above where the instruction cache is a memory within the pipeline microprocessor.

Yet another feature of the present invention is to provide the processor system as mentioned above where the plurality of micro instructions having register generic operands comprise machine level instruction primitives that do not have operands which refer to specific registers within a register file.

A further feature of the present invention is to provide the processor system as mentioned above where the selected ones of the plurality of register generic micro instruction sequences having register generic operands correspond to each of the macro instructions.

Yet another feature of the present invention is to provide the processor system as mentioned above wherein the instruction queue provides the plurality of micro instructions having register specific operands, one at a time, to the instruction register.

An additional feature of the present invention is to provide the processor system as mentioned above wherein the instruction queue includes a plurality of micro instruction registers, connected serially between the control ROM and the instruction register, for temporarily storing the plurality of micro instructions having register specific operands.

A further feature of the present invention is to provide the processor system as mentioned above wherein the plurality of micro instruction registers, which are connected serially, are also connected in parallel to the control ROM.

Yet another feature of the present invention is to provide the processor system as mentioned above where the processor system also includes a second instruction queue, connected between the translator and the instruction register, for storing a second plurality of micro instructions having register specific operands, generated by the translator, and for providing the second plurality to said instruction register.

Another feature of the present invention is to provide the processor system as mentioned above where the second instruction queue includes a second plurality of micro instruction registers, connected serially between the translator and the instruction register, for temporarily storing the second plurality of micro instructions having register specific operands.

An additional feature of the present invention is to provide the processor system as mentioned above where the processor system also includes queue control logic, connected to the instruction queue, and to the second instruction queue, for controlling the storing of the plurality of micro instructions having specific operands in the micro instruction registers, and the second plurality of micro instructions having register specific operands in the second micro instruction registers.

A further feature of the present invention is to provide the processor system as mentioned above where the queue control logic also controls the transfer of the plurality of micro instructions having specific operands, and the second plurality of micro instructions having specific operands, to the instruction register.

An advantage of the present invention as provided in the features above is that when micro instructions having register generic operands are provided to an instruction queue, and filled in with register specific operands prior to being transferred to the instruction register, stalls in the pipeline at the instruction register are reduced or effectively eliminated. By eliminating stalls relating to micro instructions having register generic operands, execution performance of the processor system is increased.

In another aspect, it is a feature of the present invention to provide a pipeline processor, for executing macro instructions, where the pipeline processor includes: an instruction cache, for storing the macro instructions; a control unit, connected to the instruction cache, for retrieving the macro instructions from the instruction cache, and for translating each of the macro instructions into a first plurality of micro instructions, the first plurality of micro instructions having register specific operands, and a second plurality of micro instructions, the second plurality having register generic operands; an instruction register, connected to the control unit, for receiving the first plurality of micro instructions; and an instruction queue, connected between the control unit and the instruction register, for temporarily storing the first plurality of micro instructions, and the second plurality of micro instructions; and operand fill in logic, connected to the control unit, and to the instruction queue, for receiving register specific operands from the control unit, and for providing the register specific operands to the second plurality of micro instructions having register generic operands; where, after the second plurality of micro instructions have been provided with the register specific operands, the second plurality of micro instructions are provided to the instruction register for execution in later stages of the pipeline processor.

Another feature of the present invention is to provide the pipeline processor as mentioned above where the instruction cache is a memory which is addressable by the control unit.

An additional feature of the present invention is to provide the pipeline processor as mentioned above where the control unit includes: a translator, connected to the instruction cache, for receiving the macro instructions therefrom, and for providing the first plurality of micro instructions having register specific operands to the instruction register; and a control ROM, connected to the translator, and to the instruction queue, for providing the second plurality of micro instructions having register generic operands to the instruction queue.

Yet another feature of the present invention is to provide the pipeline processor as mentioned above where a micro instruction sequence is generated by the control unit for each of the macro instructions received by the control unit.

A further feature of the present invention is to provide the pipeline processor as mentioned above where a first portion of the micro instruction sequence is provided by the translator, and a second portion of the micro instruction sequence is provided by the control ROM.

An additional feature of the present invention is to provide the pipeline processor as mentioned above where the second portion of the micro instruction sequence provided by the control ROM contains register generic operands.

A further feature of the present invention is to provide the pipeline processor as mentioned above where the second portion containing register generic operands are provided to the instruction queue.

Yet another feature of the present invention is to provide the pipeline processor as mentioned above where after the second portion containing register generic operands is provided to the instruction queue, the operand fill in logic receives register specific operands from the translator, and fills in the register generic operands with the register specific operands.

A further feature of the present invention is to provide the pipeline processor as mentioned above where the instruction queue further includes: a plurality of translator queue buffers, connected to the translator, for temporarily storing ones of the first plurality of micro instructions; and a plurality of control ROM queue buffers, connected to the control ROM, for temporarily storing ones of the second plurality of micro instructions.

Another feature of the present invention is to provide the pipeline processor as mentioned above where the pipeline processor further includes queue control logic, connected to the translator, to the plurality of translator queue buffers, and to the plurality of control ROM queue buffers, for sequencing the first plurality and the second plurality of micro instructions through the instruction queue.

An additional feature of the present invention is to provide the pipeline processor as mentioned above where the queue control logic selects micro instructions from either of the first plurality or the second plurality, to be provided, one at a time, to the instruction register.

Yet another feature of the present invention is to provide the pipeline processor as mentioned above where the operand fill in logic receives the register specific operands from the translator, and fills in the second plurality of micro instructions with the register specific operands while the second plurality of micro instructions are temporarily stored in the instruction queue.

Another feature of the present invention is to provide the pipeline processor as mentioned above where the plurality of translator queue buffers are connected serially to each other, and in parallel to the translator.

A further feature of the present invention is to provide the pipeline processor as mentioned above where the plurality of control ROM queue buffers are connected serially to each other, and in parallel to the control ROM.

An advantage of the present invention mentioned above is that by providing an instruction queue between the control unit and the instruction register, and by allowing the control unit to fill in micro instructions with register specific operands while in the instruction queue, macro instructions associated with the micro instructions will execute faster.

In another aspect, it is a feature of the present invention to provide a method within a pipeline processor for fast filling micro instructions having register generic operands with register specific operands, where the micro instructions are associated with macro instructions, and where the micro instructions having register generic operands are provided by a control ROM and placed within an instruction queue before being provided to an instruction register, for execution in later stages of the pipeline. The method includes the steps of: generating a micro instruction sequence associated with each of the macro instructions, where the micro instruction sequence contains micro instructions having register generic operands; storing the micro instructions to the instruction queue; providing register specific operands to the micro instructions in the instruction queue which have register generic operands; and after the step of providing, transferring the micro instructions containing the register specific operands to the instruction register.

A further feature of the present invention is to provide the method for fast filling micro instructions, as mentioned above, where within the step of generating, the micro instruction sequence also contains micro instructions having register specific operands.

Another feature of the present invention is to provide the method for fast filling micro instructions, as mentioned above, where the step of generating generates the micro instructions having register generic operands and the micro instructions having register specific operands, in parallel.

A further feature of the present invention is to provide the method for fast filling, as mentioned above, where the step of storing the micro instructions to the instruction queue, stores both the micro instructions having register generic operands and the micro instructions having register specific operands.

An additional feature of the present invention is to provide the method for fast filling, as mentioned above, where the step of transferring transfers the micro instructions containing the register specific operands, one at a time, to the instruction register.

Additional objects, features and advantages of the invention will be described hereinafter. Those skilled in the art should appreciate that they can readily use the disclosed conception and specific embodiment as a basis for designing or modifying other structures for carrying out the same purposes of the present invention.

DESCRIPTION OF THE DRAWINGS

These and other objects, features, and advantages of the present invention will become better understood with regard to the following description, and accompanying drawings where.

DETAILED DESCRIPTION

Figure 1:
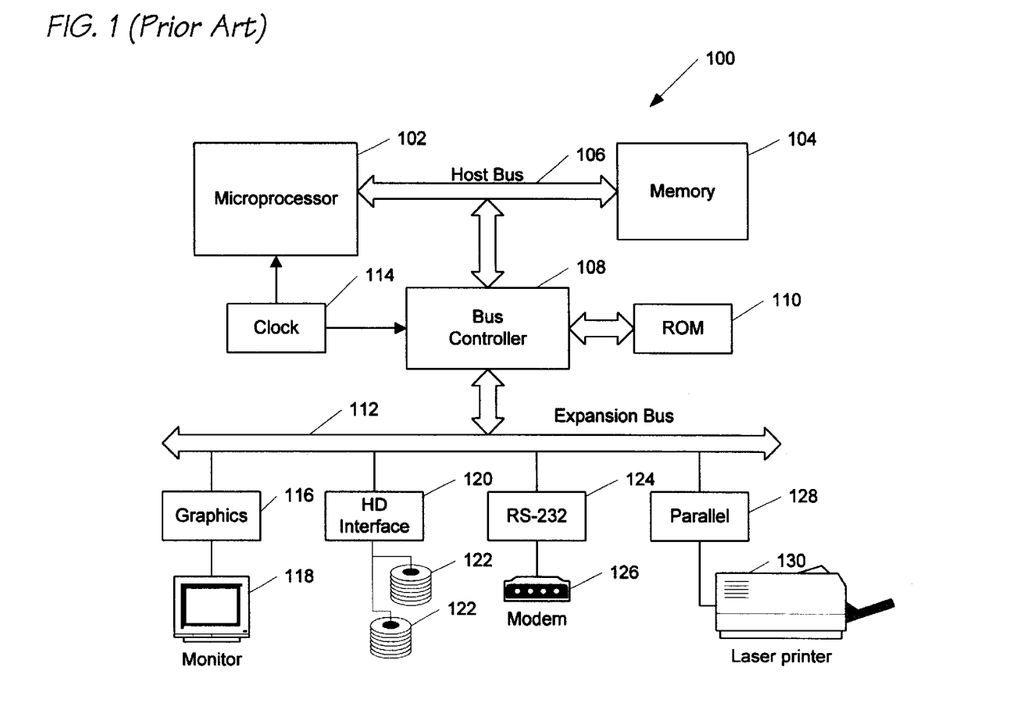
FIG. 1 is a block diagram of a prior art computer system which can incorporate the present invention.

Referring to FIG. 1, a block diagram of a typical computer system 100 is shown. The computer system 100 includes a microprocessor 102 connected to a memory 104 via a host bus 106. Also connected to the microprocessor 102 and the memory 104 via the host bus 106 is a bus controller 108. The bus controller 108 provides an interface between the host bus 106 and a ROM 110, and an expansion bus 112. A system clock 114 is provided to both the microprocessor 102 and the bus controller 108. Connected to the expansion bus 112 is a monitor 118 via a graphics controller 116, hard disk drives 122 via a disk interface 120, a modem 126 via an RS-232 interface 124, and a printer 130 via a parallel port 128.

In operation, the microprocessor 102 executes macro instructions retrieved from either the memory 104, the ROM 110 or the hard disks 122. The microprocessor can retrieve data from or store data to the memory 104 or the hard disks 122. In addition, the microprocessor can send data to either the modem 126 or the printer 130. A user interface to the microprocessor is provided by the monitor 118. The computer system 100 is typical of the type of computing system environment into which a pipeline processor according to the present invention may be used.

Figure 2:
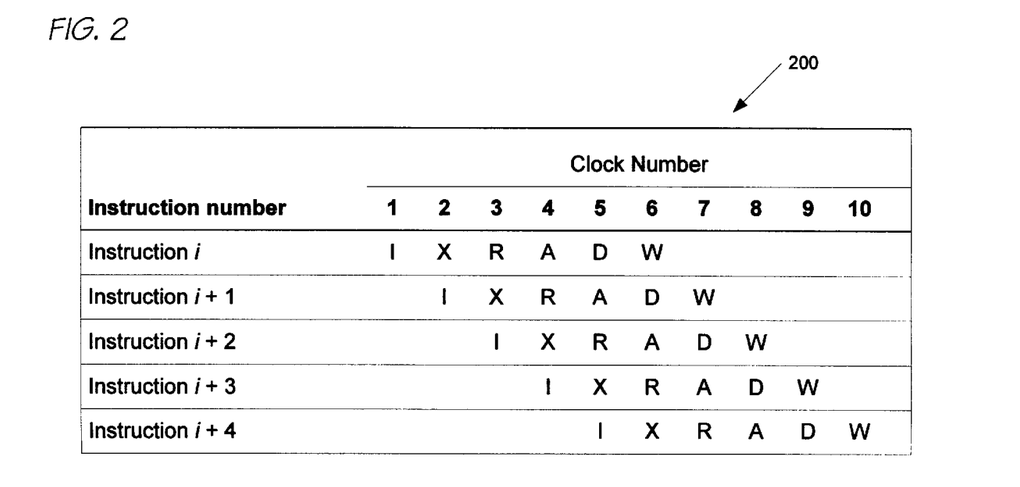
FIG. 2 is a table illustrating micro instruction flow through a pipeline processor.

Now referring to FIG. 2, a pipeline flow table 200 is provided. The flow table illustrates the execution of various micro instructions through various stages of a pipeline microprocessor. Down the left side of the table 200 are micro instructions labeled i through i+4. Across the top of the table 200 are clock cycles 1 through 10. Under the clock cycles, and to the right of the micro instructions, are pipeline stage labels I, X, R, A, D and W. These pipeline stages correspond to the stages in the pipeline processor of FIG. 3, discussed below. Briefly, the pipeline stages are I (Fetch instruction); X (Translate/decode instruction); R (Register access); A (Address calculation); D (Data manipulation or retrieval) and W (Write Back).

Figure 5:
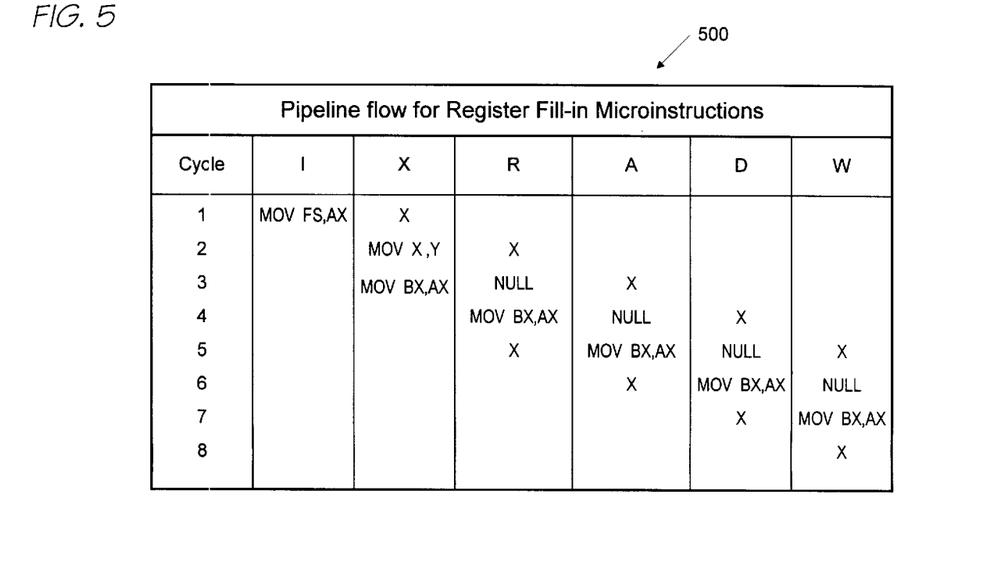
FIG. 5 is a table illustrating micro instruction flow through a pipeline processor requiring fill in of a register generic micro instruction.

During clock cycle 1, the instruction i enters the I stage. During clock cycle 2, the instruction i enters the X stage, and instruction i+1 enters the I stage. During clock cycle 3, instruction i enters the R stage, instruction i+1 enters the X stage, and instruction i+2 enters the I stage. During clock cycle 4, instruction i enters the A stage, instruction i+1 enters the R stage, instruction i+2 enters the X stage, and instruction i+3 enters the I stage. This process continues until instruction i+4 leaves the W stage at clock cycle 10. What is illustrated in FIG. 2 is a pipeline processor which executes five micro instructions, i through i+4, through a six stage pipeline processor, without creating any stall conditions, and without any holes in the pipeline. What will be shown with reference to FIG. 5 is a pipeline sequence that includes a stall condition in one of the pipeline stages. However, a discussion of a pipeline processor for executing such instructions is first provided with reference to FIG. 3.

Figure 3:
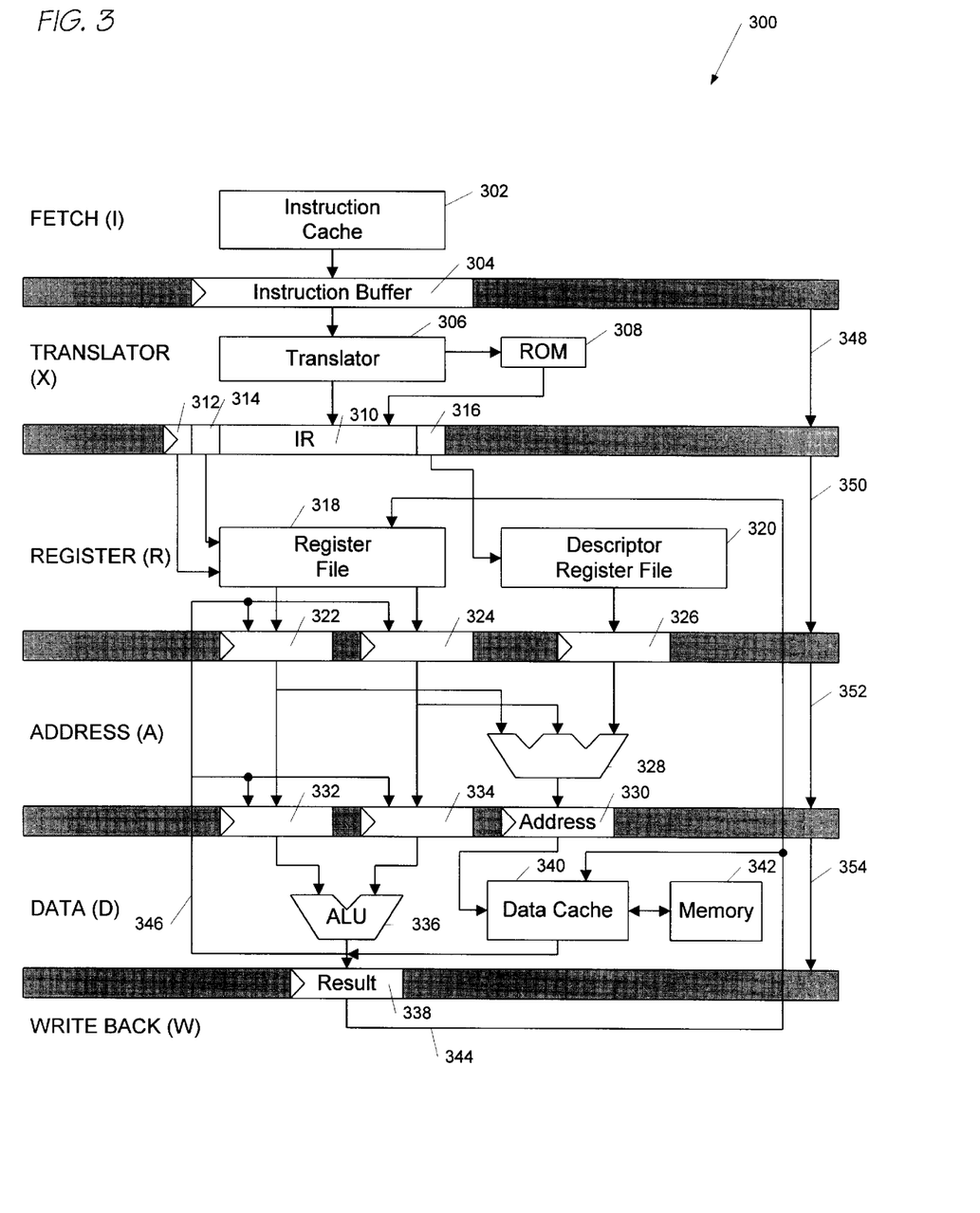
FIG. 3 is a schematic diagram of a pipeline processor which may incorporate the present invention.

Now referring to FIG. 3, a pipeline processor 300 is shown. The processor 300 has a six stage pipeline, with the stages corresponding to those discussed with reference to FIG. 2. During the fetch stage, the processor 300 sends out a value in the program counter (not shown) to fetch the next macro instruction from an instruction cache 302 and places the macro instruction into an instruction buffer 304. The instruction buffer 304 holds the macro instruction that will be needed in subsequent clock cycles. Other buffers, registers, etc. may be placed between the fetch stage and the translate/decode stage, or between other stages in the processor 300, as required. However, for ease of illustration, only specific buffer and registers have been called out.

The translate/decode stage reads the macro instruction located in the instruction buffer 304 into the translator 306. The translator 306 decodes the macro instruction into a sequence of micro instructions, and provides the micro instructions, one at a time, to an instruction register 310. Depending on the complexity of the macro instruction, and the goals of the designer, the micro instruction sequence may be provided either directly by the translator 306, by the ROM 308, or by a combination of both.

As shown, the instruction register 310 contains a number of sections 312, 314 and 316 which may be used to store information relating to the operands upon which the micro instructions will operate. These sections are provided to a register file 318 and to a descriptor register file 320 during the register stage of the pipeline. The contents of sections 312, 314 access specific registers in the register file 318 and select the contents of those registers to be output into two temporary registers 322, 324 for use in later clock cycles. Likewise, the contents of section 316 is used to access a particular descriptor register in the descriptor register file 320 which is output into a third temporary register 326. Temporary register 326 is used in later cycles to calculate an address for an operand.

When a micro instruction requires access to a memory location, either for Load or Store operations, the address stage calculates the effective address. The address is calculated by providing the contents of registers 322, 324, and 326 as inputs to an ALU circuit 328. The ALU circuit 328 selects appropriate inputs, and stores the effective address in an address register 330. For micro instructions which do not require calculation of an effective address, the contents of registers 322, 324 are forwarded directly to temporary registers 332, 334 for use in later stages.

During the data stage, one of two operations occur. The first operation provides the contents of the registers 332, 334 as inputs to an ALU 336 for operation thereon. The result of the operation is placed in a result register 338. A second operation occurs when the micro instruction is not an ALU operation, but rather a Load or Store operation from memory. In this instance, the address in register 330 is provided as input to a data cache 340 to load data therefrom. If the operation is a Load, the data in the data cache 340 is placed in the result register 338. If the data does not reside in the data cache 340, the cache 340 accesses a memory 342, retrieves the requested data, and places the data in the result register 338.

During the write back stage, the contents of the result register 338 are written into either the data cache 340 (if a memory operation), or the register file 318 (if a register operation), via signal line 344. Prior to the write back stage, however, the output of the ALU 336 or the data cache 340 are provided on a forward/bypass bus as possible inputs to temporary registers 322, 324, 332, or 334, for use in later processor cycles. Use of the forward/bypass bus allows use of the value in the result register 338 as an input to either the ALU circuit 328, or the ALU 336 on the next processor cycle.

In addition to the buffers and registers called out in FIG. 3, other information relating to micro instructions may be passed from stage to stage along buses 348, 350, 352 and 354. Thus, FIG. 3 shows how an instruction flows through the data path of pipeline processor 300. At the end of each clock cycle, every value computed during that clock cycle and required on a later clock cycle is written into a storage device, which may be a memory 342, a register file 318, or a temporary register.

Figure 4:
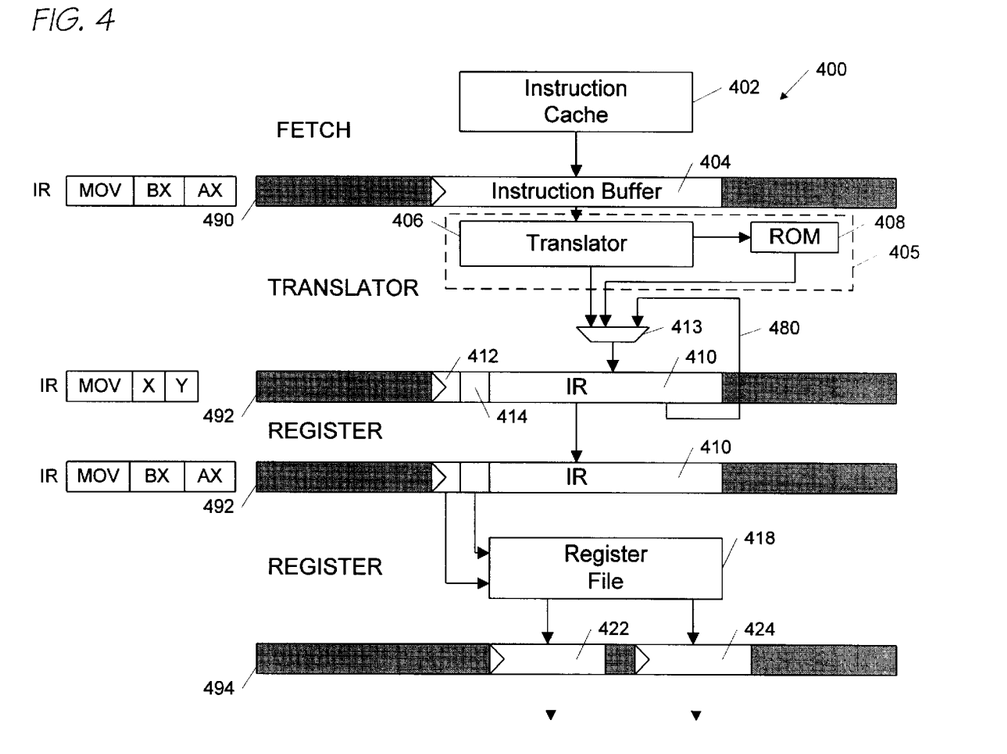
FIG. 4 is a portion of a pipeline processor illustrating a stall associated with filling in a register generic micro instruction.

Referring to FIG. 4 a portion of the pipeline processor 300 is shown. However, in FIG. 4, the pipeline sequence for a register generic micro instruction is provided. Like numerals refer to like elements, however the prefix 4 replaces the prefix 3 in the hundreds digit. In addition, the contents of the instruction buffer 404 and the instruction register 410 are shown to the left of the processor 400 as the instruction sequence proceeds through the pipeline. Also called out are operand locations 412, 414 within the instruction register 410 which hold operands associated with micro instructions stored in the instruction register 410. In addition, a forward bus 480 is provided from the instruction register 410 to the input of the mux 413. The forward bus 480 allows the contents of the instruction register 410 to be filled in with specific operands during a following clock cycle.

Referring to FIG. 5, a pipeline table 500 is provided which illustrates an execution sequence for a register generic micro instruction through the pipeline processor 400 of FIG. 4. On the left of the table 500 are listed processor clock cycles 1 through 8. Across the top of the table 500 are listed pipeline stages I, X, R, A, D and W for the processor 400. Although not shown in FIG. 4, the pipeline stages A, D and W are shown in table 500.

Attention is directed to FIGS. 4 and 5. In operation, during a first clock cycle an illustrative macro instruction MOV BX,AX is fetched from the instruction cache 402 and placed into the instruction buffer 404. The macro instruction moves the contents of register AX into segment register FS within the register file 418.

During a second clock cycle, the macro instruction is read by the control unit 405. The translator 406 within the control unit 405 addresses the control ROM 408 to obtain the appropriate micro instruction sequence that is associated with the macro instruction MOV BX,AX. In this instance, the associated micro instruction sequence is singular. At the end of clock cycle two the control ROM 408 provides a register generic micro instruction MOV X,Y to the instruction register 410.

The TRANSLATOR stage of the pipeline effectively stalls at this point. During the third clock cycle, rather than providing a register specific micro instruction to the register stage of the processor 400, the translator 406 must fill in the specific operands associated with the macro instruction into the instruction register 410. One familiar with pipeline processing techniques will recognize that if the instruction register is not able to provide a register specific operand during each processor clock cycle, a "hole" will be created in the pipeline. And, every hole in the pipeline creates delays in instruction processing. By the end of clock cycle three, the translator 406 has effectively placed the specific operands BX, and AX, associated with the macro instruction, into the instruction register 410, within the operand locations 412, 414.

During clock cycle four, the operands in locations 412, 414 are provided to the register file 418. The register file 418 accesses the contents of register AX and segment register BX. The contents of these registers are provided to register buffers 422 and 424 for later use in the pipeline. As shown in FIG. 4, the micro instruction MOV BX,AX proceeds down the following stages of the pipeline until complete. Also shown is the hole indicated by NULL, which follows the MOV BX,AX micro instruction through the pipeline.

What should be clear at this point is that when register generic micro instructions are provided from the control ROM 408, and later filled in with specific operands from the translator 406, holes or delays are created in the pipeline processor 400.

Figure 6:
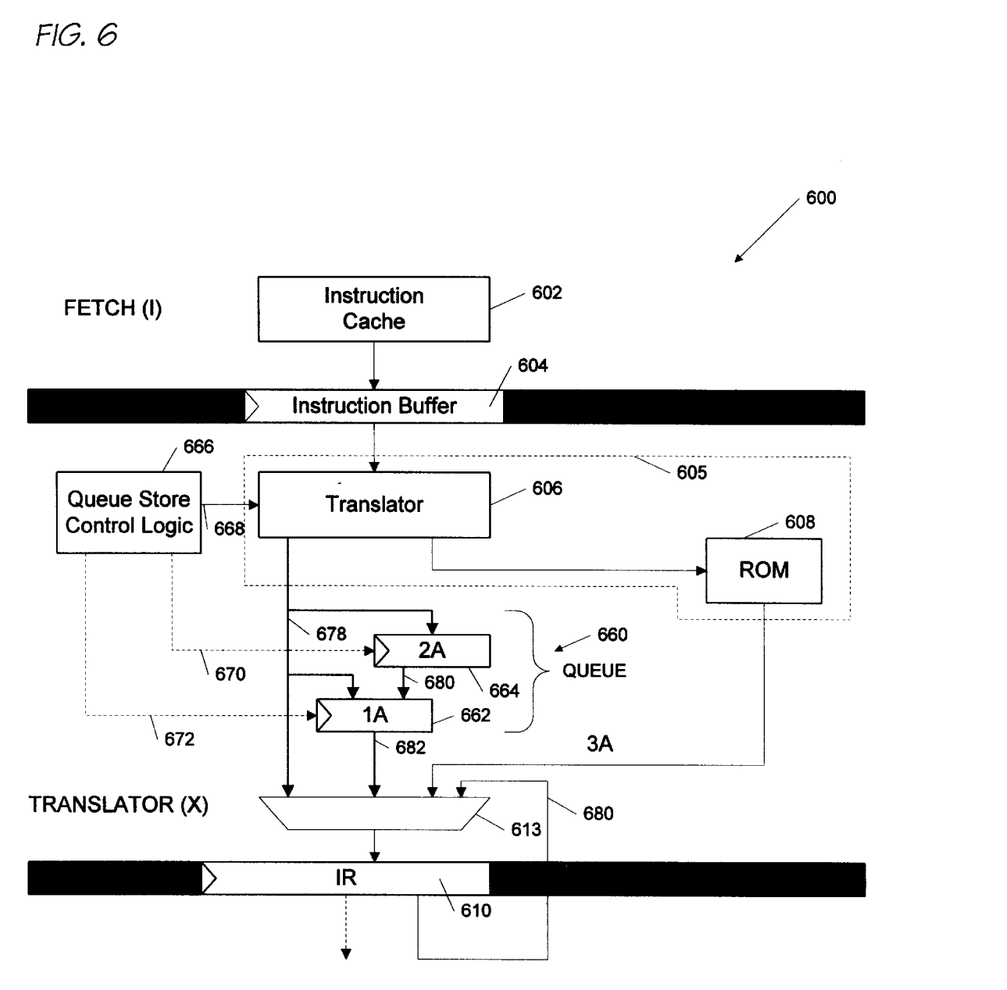
FIG. 6 is a portion of a pipeline processor illustrating an instruction queue between the translator and the instruction register.

Now referring to FIG. 6, a portion of a pipeline processor 600 is shown. Like numerals refer to like elements except the prefix in the hundreds digit has been replaced with a 6. The pipeline processor includes an instruction cache 602 which provides macro instructions to an instruction buffer 604. The instruction buffer 604 provides the macro instructions to a control unit 605 containing a translator 606 and a control ROM 608. The control unit 605 decodes the macro instructions into sequences of micro instructions associated with each macro instruction. In one embodiment, the control unit 605 can provide a sequence of micro instructions either from the translator 606, or the control ROM 608, or from a combination of the two.

What was discussed with reference to FIGS. 4 and 5 is how holes or delays in a pipeline are created when register generic micro instructions are provided by a control ROM such as the control ROM 608. One technique used to reduce or eliminate holes created by delays in the translator stage of a pipeline processor is to insert an instruction queue 660 between the instruction buffer 604, and the instruction register 610. A thorough discussion of this technique is found in U.S. Pat. No. 5,619,667, referenced above. A similar instruction queue 660 is provided in the processor 600 which contains a first buffer 662, and a second buffer 664 connected between the translator 606 and a mux 613. The buffers 662 and 664 are connected serially to each other, via bus 680 and in parallel to the translator 606 via bus 678. Buffer 662 is connected to the mux 613 via bus 682. The instruction queue 660 also contains queue store control logic 666 which controls the sequencing of instructions from the translator 606 to the mux 613 via control lines 668, 670 and 672. What will now be shown, is how the instruction queue 660 functions when a micro instruction sequence is provided by both the translator 606 and the control ROM 608, and when the sequence contains a register generic micro instruction provided by the control ROM 608. Below is a table I which illustrates the flow of a micro instruction sequence from the translator 606 and the control ROM 608 through the instruction queue 660 and to the instruction register 610.

TABLE I

| Cycle | Translator | ROM | IR |
| --- | --- | --- | --- |
| 1 | fetch macro | | |
| 2 | 1A, 2A | | stalled |
| 3 | | 3A-generic | 1A |
| 4 | | 3A-generic | 2A |
| 5 | | 3A-generic | 3A-generic |
| 6 | 1B | | 3A |
| 7 | | | 1B |

During clock cycle 1, a macro instruction is fetched from the instruction cache 602 and provided to the instruction buffer 604. For ease of illustration, the macro instruction is assumed to require a sequence of micro instructions denoted 1A, 2A and 3A, where micro instructions 1A and 2A will be provided by the translator 606, and micro instruction 3A will be provided by the control ROM 608.

During clock cycle 2, a stall is presumed to have occurred in a later stage of the pipeline which allows the translator 606 to provide micro instructions 1A and 2A to the instruction queue 660, in buffers 662 and 664, respectively.

During clock cycle 3, the queue store control logic 666 provides micro instruction 1A to the instruction register 610. In addition, the micro instruction 2A is moved from buffer 664 into buffer 662. Furthermore, the control ROM 608 has had enough time to look up micro instruction 3A and provide it as an input to the mux 613. At this point, however, micro instruction 3A does not contain register specific operands.

During clock cycle 4, micro instruction 2A is provided to the instruction register 610. In addition micro instruction 3A still resides, in register generic form, at the input to mux 613.

During clock cycle 5, micro instruction 3A is provided to the instruction register 610 in register generic form. At this point, a stall occurs in the pipeline because the register generic micro instruction 3A must be filled in with register specific operands.

During clock cycle 6, the instruction register 610 provides the generic micro instruction back to the mux 613 via bus 680, which allows the translator 606, via bus 678, to fill in the register specific operands. At the end of clock cycle 6, micro instruction 3A is stored into the instruction register 610 with register specific operands.

During clock cycle 7, the micro instruction 3A proceeds to later stages in the pipeline processor 600.

What should be appreciated, at this point, is that the instruction queue 660 has allowed the translator 606 to take advantage of the instruction queue 660 and "get ahead" of the instruction register 610. But, where a portion of a micro instruction sequence is provided by the control ROM 608, and where the control ROM 608 provides a register generic micro instruction, the processor 600 still stalls for a clock cycle during the fill in of the register generic micro instruction.

Figure 7:
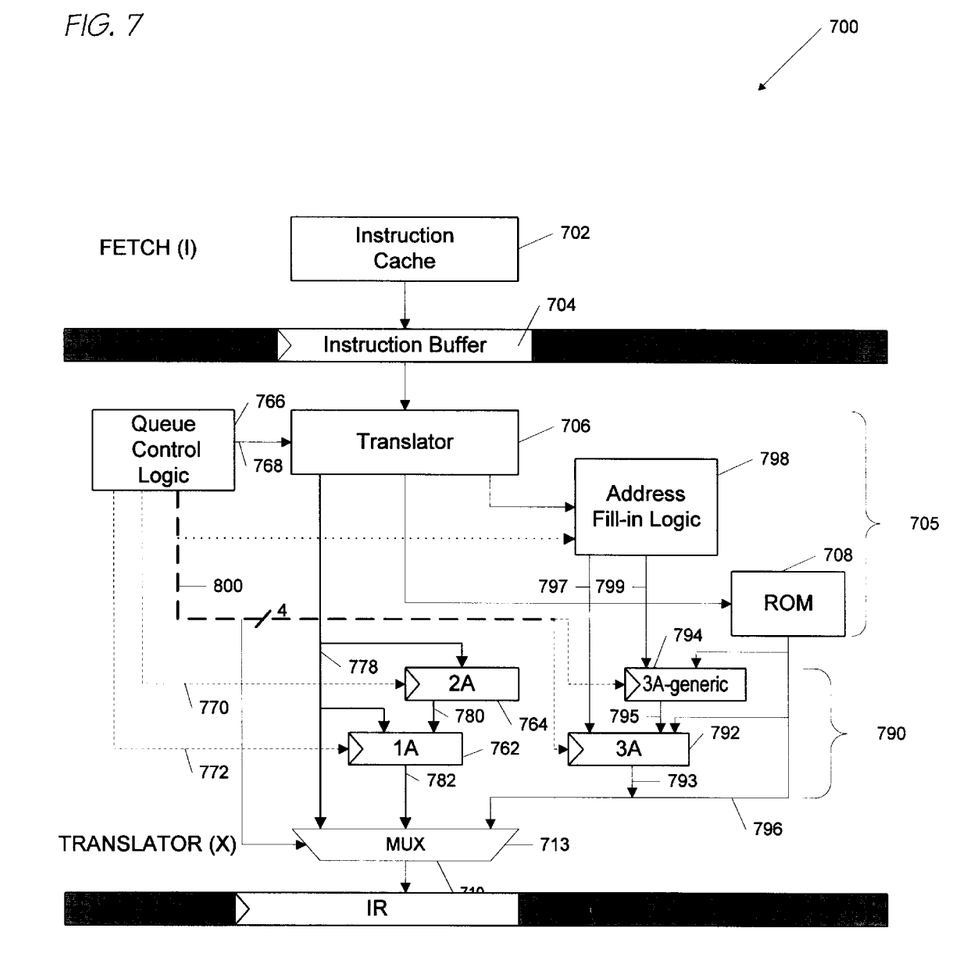
FIG. 7 is a portion of a pipeline processor illustrating an instruction queue according to the present invention which allows register specific fill in of operands within the instruction queue.

Now referring to FIG. 7, a pipeline processor 700 is provided which is similar to the processor 600 discussed with reference to FIG. 6. Like numerals refer to like elements except that the hundreds digit 6 has been replaced with 7.

In addition to what was illustrated in FIG. 6, the processor 700 contains a ROM instruction queue 790 having ROM queue buffers 792, 794. The ROM buffers 792, 794 are connected serially to each other via bus 795, and are connected in parallel to the control ROM 708 via bus 796. The buffer 792 is connected to the mux 713 via bus 793. Sequencing of micro instructions through the ROM instruction queue is performed by queue control logic 766 via bus 800. In addition, operand fill in logic 798 is provided which is connected to buffers 792, 794 via buses 797 and 799, respectively. Operation of the ROM instruction queue is discussed with reference to the table II below.

TABLE II

| Cycle | Translator | ROM | IR |
|---|---|---|---|
| 1 | fetch macro | | |
| 2 | 1A, 2A | | stalled |
| 3 | | 3A-generic | 1A |
| 4 | | 3A | 2A |
| 5 | 1B | | 3A |
| 6 | | | 1B |

During clock cycle 1, a macro instruction is fetched from the instruction cache 702 and provided to the instruction buffer 704.

During clock cycle 2, the processor 700 is presumed to have stalled in later stages of the pipeline. This allows the translator 706 to provide micro instructions 1A, 2A to the instruction queue 760 in buffers 762, 764, respectively.

During clock cycle 3, the queue control logic 766 sequences the micro instructions 1A, 2A through the instruction queue 760 and provides micro instruction 1A to the instruction register 710. In addition, the control ROM 708 has had time to look up micro instruction 3A and provides 3A to the ROM instruction queue 790 at location 794. At this point, the micro instruction 3A has register generic operands.

During clock cycle 4, the queue control logic 766 sequences micro instruction 2A into the instruction register 710. In addition, the queue control logic 766 sequences micro instruction 3A from queue buffer 794 to buffer 792. In addition, operand fill in logic 798 writes the register specific operands associated with micro instruction 3A into buffer 792.

During clock cycle 5, the queue control logic 766 sequences micro instruction 3A from the queue buffer 792 to the instruction register 710.

During clock cycle 6, the micro instruction 3A is transferred to later stages in the pipeline for execution thereon. It should be noted that micro instruction 3A did not require the processor 700 to stall in the instruction register 710, because by the time micro instruction 3A reached the instruction register 710, register specific operands had been filled in by the operand fill in logic 798.

Thus, by providing an instruction queue between the control ROM 708 and the instruction register 710, and by allowing fill in of register specific operands while micro instructions sequence through the ROM instruction queue, stalls associated with register generic micro instructions are reduced, or eliminated.

Although the present invention has been described in considerable detail with reference to certain preferred versions thereof, other versions are possible. For example, for ease of illustration, two instruction queues were shown to exist: one for the translator, and one for the control ROM. In some embodiments, it may be advantageous to utilize an instruction queue which is connected to both the translator and the control ROM. Furthermore, the queue control logic was shown to control both the translator instruction queue, and the control ROM instruction queue. Alternative embodiments may separate this logic into two discrete portions which are synchronized. Additionally, the operand fill in logic was shown separately from the translator. But, in some processors, this logic may be contained within either the translator, or the queue control logic, for example. What should be appreciated is that by buffering micro instructions between a source which generates register generic micro instructions, and an instruction register, and allowing fill in of register specific operands into those micro instructions while they reside in the buffer, delays or holes typically associated with register generic micro instructions are reduced or eliminated.

We claim:

1. A processor system, for executing macro instructions, the processor system comprising:

an instruction cache, for storing the macro instructions;

a control unit, coupled to said instruction cache, for retrieving said macro instructions from said instruction cache, and for translating each of said macro instructions into a plurality of micro instructions, said plurality of micro instructions having register generic operands, said control unit comprising:

a control ROM, for storing said plurality of micro instruction sequences having register generic operands; and a translator, coupled to said control ROM, for providing register specific operands;

an instruction register, coupled to said translator, for storing a plurality of micro instructions having register specific operands, for execution in later stages of said processor system;

an instruction queue, coupled to said control ROM and to said instruction register, for receiving from said control ROM, and for temporarily storing, said plurality of micro instructions having register generic operands, and for providing said plurality of micro instructions having register specific operands to said instruction register; and operand fill in logic, coupled to said translator, and to said instruction queue, for receiving said register specific operands from said translator, and for converting said plurality of micro instructions having register generic operands into said plurality of micro instructions having register specific operands.

2. The processor system as recited in claim 1 wherein said processor system is a pipeline microprocessor.

3. The processor system as recited in claim 2 wherein said instruction cache is a memory within said pipeline microprocessor.

4. The processor system as recited in claim 1 wherein said instruction cache is a memory for storing macro instructions.

5. The processor system as recited in claim 1 wherein said control ROM is a read only memory.

6. The processor system as recited in claim 1 wherein said plurality of micro instructions having register generic operands comprise machine level instruction primitives that do not have operands which refer to specific registers within a register file.

7. The processor system as recited in claim 1 wherein said selected ones of said plurality of register generic micro instruction sequences correspond to said macro instructions.

8. The processor system as recited in claim 1 wherein said instruction queue provides said plurality of micro instructions having register specific operands, one at a time, to said instruction register.

9. The processor system as recited in claim 1 wherein said instruction queue comprises a plurality of micro instruction registers, connected serially between said control ROM and said instruction register, for temporarily storing said plurality of micro instructions having register specific operands.

10. The processor system as recited in claim 9 wherein said plurality of micro instruction registers, which are connected serially, are also connected in parallel to said control ROM.

11. A processor system, for executing macro instructions, the processor system comprising:
   an instruction cache, for storing the macro instructions;
   a control unit, coupled to said instruction cache, for retrieving said macro instructions from said instruction cache, and for translating each of said macro instructions into a plurality of micro instructions, said plurality of micro instructions having register generic operands, said control unit comprising:
      a control ROM, for storing said plurality of micro instruction sequences having register generic operands; and
      a translator, coupled to said control ROM, for providing register specific operands;
   an instruction register, coupled to said translator, for storing a plurality of micro instructions having register specific operands, for execution in later stages of said processor system;
   an instruction queue, coupled to said control ROM and to said instruction register, for receiving from said control ROM, and for temporarily storing, said plurality of micro instructions having register generic operands, and for providing said plurality of micro instructions having register specific operands to said instruction register;
   a second instruction queue, coupled between said translator and said instruction register, for storing a second plurality of micro instructions having register specific operands, generated by said translator, and for providing said second plurality of micro instructions to said instruction register; and
   operand fill in logic, coupled to said translator, and to said instruction queue, for receiving said register specific operands from said translator, and for converting said plurality of micro instructions having register generic operands into said plurality of micro instructions having register specific operands.

12. The processor system as recited in claim 11 wherein said second instruction queue comprises a second plurality of micro instruction registers, connected serially between said translator and said instruction register, for temporarily storing said second plurality of micro instructions having register specific operands.

13. The processor system as recited in claim 12 further comprising queue control logic, connected to said instruction queue, and to said second instruction queue, for controlling the storing of said plurality of micro instructions having specific operands in said micro instruction registers, and said second plurality of micro instructions having register specific operands in said second micro instruction registers.

14. The processor system as recited in claim 13 wherein said queue control logic also controls the transfer of said plurality of micro instructions having specific operands, and said second plurality of micro instructions having specific operands, to said instruction register.

15. A pipeline processor, for executing macro instructions, the pipeline processor comprising:
   an instruction cache, for storing said macro instructions;
   a control unit, connected to said instruction cache, for retrieving said macro instructions from said instruction cache, and for translating each of said macro instructions into a first plurality of micro instructions, said first plurality of micro instructions having register specific operands, and a second plurality of micro instructions, said second plurality having register generic operands;
   an instruction register, connected to said control unit, for receiving said first plurality of micro instructions; and
   an instruction queue, connected between said control unit and said instruction register, for temporarily storing said first plurality of micro instructions, and said second plurality of micro instructions; and
   operand fill in logic, connected to said control unit, and to said instruction queue, for receiving register specific operands from said control unit, and for providing said register specific operands to said second plurality of micro instructions having register generic operands;
   whereby, after said second plurality of micro instructions have been provided with said register specific operands, said second plurality of micro instructions are provided to said instruction register for execution in later stages of said pipeline processor.

16. The pipeline processor as recited in claim 15 wherein said instruction cache is a memory which is addressable by said control unit.

17. The pipeline processor as recited in claim 15 wherein said control unit further comprises:
   a translator, connected to said instruction cache, for receiving said macro instructions therefrom, and for providing said first plurality of micro instructions having register specific operands to said instruction register; and
   a control ROM, connected to said translator, and to said instruction queue, for providing said second plurality of micro instructions having register generic operands to said instruction queue.

18. The pipeline processor as recited in claim 17 wherein a micro instruction sequence is generated by said control unit for each of said macro instructions received by said control unit.

19. The pipeline processor as recited in claim 18 wherein a first portion of said micro instruction sequence is provided by said translator, and a second portion of said micro instruction sequence is provided by said control ROM.

20. The pipeline processor as recited in claim 19 wherein said second portion of said micro instruction sequence provided by said control ROM contains register generic operands.

21. The pipeline processor as recited in claim 20 wherein said second portion containing register generic operands are provided to said instruction queue.

22. The pipeline processor as recited in claim 21 wherein after said second portion containing register generic operands is provided to said instruction queue, said operand fill in logic receives register specific operands from said translator, and fills in said register generic operands with said register specific operands.

23. The pipeline processor as recited in claim 15 wherein said pipeline processor contains multiple pipeline stages which are connected serially, but which operate simultaneously.

24. A pipeline processor, for executing macro instructions, the pipeline processor comprising:

an instruction cache, for storing said macro instructions;

a control unit, coupled to said instruction cache, for retrieving said macro instructions from said instruction cache, and for translating each of said macro instructions into a first plurality of micro instructions, said first plurality of micro instructions having register specific operands, and a second plurality of micro instructions, said second plurality having register generic operands;

an instruction register, coupled to said control unit, for receiving said first plurality of micro instructions; and an instruction queue, coupled between said control unit and said instruction register, for temporarily storing said first plurality of micro instructions, and said second plurality of micro instructions; said instruction queue comprising:

a plurality of translator queue buffers, connected to said translator, for temporarily storing ones of said first plurality of micro instructions; and     a plurality of control ROM queue buffers, connected to said control ROM, for temporarily storing ones of said second plurality of micro instructions; and operand fill in logic, connected to said control unit, and to said instruction queue, for receiving register specific operands from said control unit, and for providing said register specific operands to said second plurality of micro instructions having register generic operands;

whereby, after said second plurality of micro instructions have been provided with said register specific operands, said second plurality of micro instructions are provided to said instruction register for execution in later stages of said pipeline processor.

25. The pipeline processor as recited in claim 24 further comprising queue control logic, connected to said translator, to said plurality of translator queue buffers, and to said plurality of control ROM queue buffers, for sequencing said first plurality and said second plurality of micro instructions through said instruction queue.

26. The pipeline processor as recited in claim 25 wherein said queue control logic selects micro instructions from either of said first plurality or said second plurality, to be provided, one at a time, to said instruction register.

27. The pipeline processor as recited in claim 17 wherein said operand fill in logic receives said register specific operands from said translator, and fills in said second plurality of micro instructions with said register specific operands while said second plurality of micro instructions are temporarily stored in said instruction queue.

28. The pipeline processor as recited in claim 24 wherein said plurality of translator queue buffers are connected serially to each other, and in parallel to said translator.

29. The pipeline processor as recited in claim 24 wherein said plurality of control ROM queue buffers are connected serially to each other, and in parallel to said control ROM.

30. A method within a pipeline processor for fast filling micro instructions having register generic operands with register specific operands, where the micro instructions are associated with macro instructions, and where the micro instructions having register generic operands are provided by a control ROM and placed within an instruction queue before being provided to an instruction register, for execution in later stages of the pipeline, the method comprising the steps of:

generating a micro instruction sequence associated with each of the macro instructions, where the micro instruction sequence contains micro instructions having register generic operands;

storing the micro instructions to the instruction queue;

providing register specific operands to the micro instructions in the instruction queue which have register generic operands; and     after said step of providing, transferring the micro instructions containing the register specific operands to the instruction register.

31. The method for fast filling micro instructions as recited in claim 30 wherein said step of generating further comprises generating micro instructions having register specific operands within said micro instruction sequence.

32. The method for fast filling micro instructions as recited in claim 31 wherein said step of generating generates said micro instructions having register generic operands and said micro instructions having register specific operands, in parallel.

33. The method for fast filling micro instructions as recited in claim 31 wherein said step of storing the micro instructions to the instruction queue, stores both of said micro instructions having register generic operands and said micro instructions having register specific operands.

34. The method for fast filling micro instructions as recited in claim 30 wherein said step of providing register specific operands to the micro instructions having register generic operands is provided by a translator.

35. The method for fast filling micro instructions as recited in claim 31 wherein said step of transferring transfers the micro instructions containing the register specific operands, one at a time, to the instruction register.

* * * * *